United States Patent
Heikes et al.

(10) Patent No.: US 9,304,205 B2
(45) Date of Patent: Apr. 5, 2016

(54) DISTANCE CALIBRATION BY EVENT POINTS

(71) Applicant: Garmin Switzerland GmbH, Schaffhausen (CH)

(72) Inventors: Joe S. Heikes, Olathe, KS (US); Kristin M. Massoth, Prairie Village, KS (US); Brian D. Becker, Olathe, KS (US); David J. Downey, Louisburg, KS (US)

(73) Assignee: Garmin Switzerland GmbH (CH)

( * ) Notice: Subject to any disclaimer, the term of this patent is extended or adjusted under 35 U.S.C. 154(b) by 78 days.

(21) Appl. No.: 14/220,550

(22) Filed: Mar. 20, 2014

(65) Prior Publication Data

US 2015/0120186 A1 Apr. 30, 2015

Related U.S. Application Data

(60) Provisional application No. 61/898,060, filed on Oct. 31, 2013.

(51) Int. Cl.

| | |
|---|---|
| *G01C 21/00* | (2006.01) |
| *G01S 19/13* | (2010.01) |
| *G01C 22/00* | (2006.01) |
| *G01S 19/19* | (2010.01) |
| *G01S 19/40* | (2010.01) |
| *G01S 5/02* | (2010.01) |

(52) U.S. Cl.
CPC ............... *G01S 19/13* (2013.01); *G01C 22/006* (2013.01); *G01S 5/021* (2013.01); *G01S 5/0263* (2013.01); *G01S 19/19* (2013.01); *G01S 19/40* (2013.01)

(58) Field of Classification Search
USPC .......................................... 701/468
See application file for complete search history.

(56) References Cited

U.S. PATENT DOCUMENTS

| | | | | |
|---|---|---|---|---|
| 2012/0253489 | A1* | 10/2012 | Dugan ............................ | 700/91 |
| 2014/0163871 | A1* | 6/2014 | Shingyoji ...................... | 701/490 |
| 2014/0300490 | A1* | 10/2014 | Kotz et al. ................... | 340/870.3 |
| 2014/0350767 | A1* | 11/2014 | Fries ............................. | 701/23 |

* cited by examiner

*Primary Examiner* — Hussein A. Elchanti
(74) *Attorney, Agent, or Firm* — Samuel M. Korte; Maxwell M. Ali

(57) ABSTRACT

An electronic device for tracking a distance traveled by a user along a course comprises a location determining element, a memory element, and a processing element. The location determining element is configured to receive location signals from a satellite-based positioning system and to determine a current geolocation of the user. The memory element is configured to store geolocations for a start point, an end point, and a plurality of intermediate event points that are passed by the user as he travels along the course, wherein each event point is positioned at a known distance from a stored geolocation such as the start point or another event point. The processing element is configured to determine a measured distance based on the current geolocation of the user and to determine a calibrated distance as a function of the measured distance and the known distances of the event points.

19 Claims, 4 Drawing Sheets

DISTANCE CALIBRATION BY EVENT POINTS

RELATED APPLICATIONS

The current non-provisional patent application claims priority benefit, with regard to all common subject matter, of an earlier-filed U.S. provisional patent application titled "DISTANCE CALIBRATION BY EVENT POINTS", application Ser. No. 61/898,060, filed Oct. 31, 2013. The earlier-filed application is hereby incorporated by reference into the current application in its entirety.

BACKGROUND

Participants competing in running, walking, or biking events, such as marathons, triathlons, and the like, often utilize an electronic device to help them gauge their performance. The electronic device may track a distance traveled by the participant as well as performance metrics that are based on the distance traveled from a geolocation at which the measurement began. The information tracked may include the distance to go, the pace, the projected time to finish the event, and the like. Tracking these performance metrics may help the participant adjust his performance to meet a desired goal.

SUMMARY

Embodiments of the present technology provide an electronic device for tracking a distance traveled by a user along a course with improved accuracy. The electronic device broadly comprises a location determining element, a memory element, and a processing element. The location determining element is configured to receive location signals from a satellite-based positioning system and to determine a current geolocation of the user. The memory element is configured to store geolocations for a start point, an end point, and a plurality of intermediate event points that are passed by the user as he or she travels along the course, wherein each event point is positioned at a known distance from a stored geolocation. The stored geolocation may include the start point or another event point. The processing element is configured to determine a measured distance based on the current geolocation of the user and to determine a calibrated distance as a function of the measured distance and the known distances of the event points.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology is described in detail below with reference to the attached drawing figures, wherein.

Figure 1:
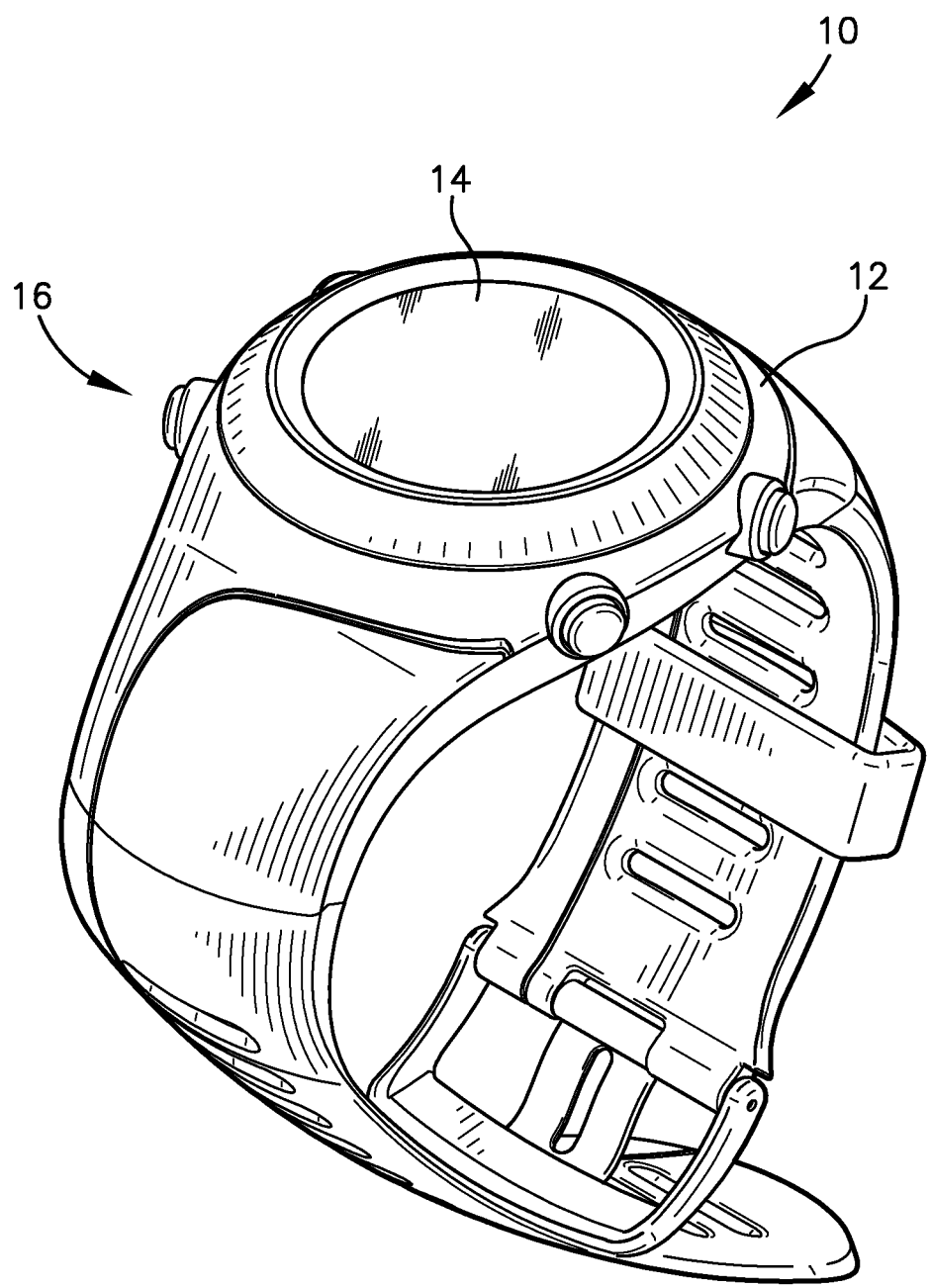
FIG. 1 is a perspective view of an electronic device for tracking a distance traveled by a user along a course, constructed in accordance with embodiments of the present technology.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology provide an electronic device that may be worn on a user's wrist and that tracks a distance that the user has traveled along a course with improved accuracy. The electronic device may be a fitness watch, a smart phone, a navigation device, a wearable fitness device such as a Garmin Forerunner, other wearable electronic devices such as activity trackers, wellness bracelets, pedometers, a cycle computer or other apparatus-mounted fitness or exercise device, combinations thereof, and the like. Although the electronic device is typically worn on the wrist, the electronic device may also be worn on other parts of the body such as the forearm or the upper arm. The electronic device may be worn by users who are running, jogging, hiking, walking, biking, or engaged in similar activities along a course.

In some cases, a user may use the electronic device during a competition or other event. The course may be a path along roads, streets, paths, or other surfaces such as may be utilized during a marathon, triathlon, or other running or biking event. The event course may also include an off road trail that is used for biking, hiking, walking, or running. The course may further include a track such as an oval track that may be used for biking, running, or walking. Alternatively, the course may be any path that includes roads, streets, sidewalks, trails, tracks, or combinations thereof which is defined by the user.

Generally, the course includes a start point, an end point, and a plurality of intermediate event points. These points are associated with one or more geolocations (e.g., geographic coordinates) and may be referred to as "event points". The event points may include mile markers, restrooms, aid stations, water stations, and the like. In embodiments, an event point may be associated with a plurality of geolocations. For instance, the geolocations may collectively form a virtual line segment that extends across a road or path of a course such that the distance between the virtual line segments formed by the geolocations associated with two event points is approximately equal to a predetermined distance between those event points (e.g., one mile between mile markers). Confirming that a user passed through a virtual line segment may help verify that the user passed one or more event points along a course. For example, a plurality of geolocations may be associated with an end point to collectively form a virtual line segment that may extend across a road or path of a course similar to a banner at the finish line of a course. In embodiments, the event points may be associated with geolocations at which a user may change equipment used or an activity type in a triathlon or similar multi-activity course. For example, an event point may be a geolocation at which a user should transition from a swimming activity to a biking activity. In embodiments, a first event point may be associated with an entrance to a transition and a second event point may be associated with an exit to the transition.

Furthermore, the course may include at least a first transmitter positioned at the start point and a second transmitter positioned at the end point. For example, the transmitters may be integrated with or placed in the vicinity of timing mats, in the proximity of or on which the user steps as he passes through the start point, intermediate event points and end point, such as a finish line. The geolocations of the start point, the end point, and the event points may be known from published materials or other sources. In addition, the distance of each event point from one or more stored geolocations, such as the start point or from other event points, may be known and stored in the electronic device.

While the user is traveling along the course, the electronic device may track the distance that the user has traveled from a geolocation at which the measurement began, e.g., the user's starting point, as well as calculate performance metrics associated with the user or course, such as elapsed distance, the distance to go, the pace, the projected time to finish the course, and the like. For example, the device may calculate the elapsed distance by comparing the current geographic location to the starting geographic location.

Electronic devices typically include a location determining element, such as a global positioning system (GPS) receiver, that determines the current geolocation of the user. Due to a variety of factors, such as atmospheric conditions and the performance of the GPS receiver, the current geolocation determined and provided by the location determining element may differ from the actual location of the user. The electronic device may further include a processing element that uses the current geolocation to calculate a measured distance which the user has traveled. The mathematical difference between the current geolocation and the actual location of the user may result in errors in the measured distance. These errors may accumulate and increase as the user travels further on the event course. Accordingly, the performance metrics may have errors caused by the errors in the measured distance. Also, the measured distance covered on an event course may be different from the official distance of the course due to a variety of factors, including a user's deviation from the centerline of the official route.

Additionally, conventional electronic devices may provide a target pace at which to travel along a course in order to complete the course within a desired time. Such a target pace is generally determined prior to the start of a race along course and does not account for deviations from the target pace by users. Embodiments of the present invention may identify deviations from a target pace along the course and dynamically account for such deviations by suggesting a pace required to reach the end point based on a time goal. Embodiments of the present invention may also use information associated with a previous travel along the route by the user of the electronic device or another user to dynamically suggest a pace required to reach the end point. The suggested pace may be presented on a display as a numeric value or a graphic incorporating one or more visual elements. Use of a calibrated distance based on a user passing event points may enhance the accuracy of performance metrics, such as pace, provided to the user of device. As a result, the user of device may be able to properly adjust his performance to meet his performance goals while traveling along the course.

For example, the user may decide to run a 26.2 mile marathon. Due to the various environmental and performance factors mentioned above, a conventional GPS fitness device may indicate that the user has run 1.2 miles when the user reaches the 1 mile marker. This discrepancy between the measured distance (using GPS coordinates) and the event distance (determined by the mile marker) can cause user confusion and inhibit the user from properly applying performance metrics provided by the device. For instance, a user's pace, speed, and distance goals may vary based on the remaining distance in the course. These measurement errors may also cause the fitness device to indicate an incorrect distance when the user completes the race. In the marathon example, the fitness device may improperly indicate that the user traveled 26.1 miles, 26.3 miles, or other distances that are different than the measured course distance. Not only is this discrepancy upsetting to users, it distorts pace and performance information associated with the race.

Embodiments of the present technology provide an electronic device that includes a processing element which uses the known distances to certain geolocations along the course, such as the event points, to reduce and account for errors inherent in the measured distance. Thus, the processing element may determine a calibrated distance that is a function of the measured distance and the known distances of an event point from a stored geolocation. Furthermore, the processing element may utilize the calibrated distance to determine the performance metrics associated with the user or course. Thus, for example, the device may utilize the stored latitude and longitude of event points (e.g., course mile markers) to calibrate the distance traversed by the user—e.g., identifying that the user has run ten miles when passing the ten mile marker even if recorded GPS coordinates indicate the user has run 10.3 miles.

Embodiments of the technology will now be described in more detail with reference to the drawing figures. Referring initially to FIGS. 1-4, an electronic device 10 for tracking a distance traveled by a user along a course 100 is illustrated. The electronic device 10 broadly comprises a housing 12, a display 14, a user interface 16, a communication element 18, a location determining element 20, a wireless receiving element 22, a memory element 24, and a processing element 26. The course 100 may include a start point, an end point, and a plurality of intermediate event points. In the exemplary course 100 shown in FIG. 5, the course 100 may include a route for a marathon and the intermediate event points may be associated with the geolocations of mile markers along the route. In embodiments, the user may create a custom course 100 on a website or via user interface 16 by specifying any start point, intermediate event points and any end point. Geolocation, as used herein, may refer to latitude and longitude, map code, road code, geographic coordinates, and/or any other representation of geographic location.

The housing 12, seen in FIG. 1, houses or retains other components of the electronic device 10 and may include or be coupled to a wristband or other straps that can attach the electronic device 10 to the user's wrist or other parts of the body. The housing 12 may include a plurality of sides with a lower surface, an upper surface, and an internal cavity. The lower surface may contact the user's wrist while the user is wearing the electronic device 10. The upper surface opposes the lower surface and may retain the display 14 and other components. The inner cavity may retain components such as, but not limited to, the communication element 18, the location determining element 20, the wireless receiving element 22, the memory element 24, and the processing element 26. In some embodiments, the upper and lower surfaces may have a round, circular, or oval shape. In other embodiments, the upper and lower surfaces may have a four-sided shape, such as a square or rectangle, or other polygonal shape.

Figure 2:
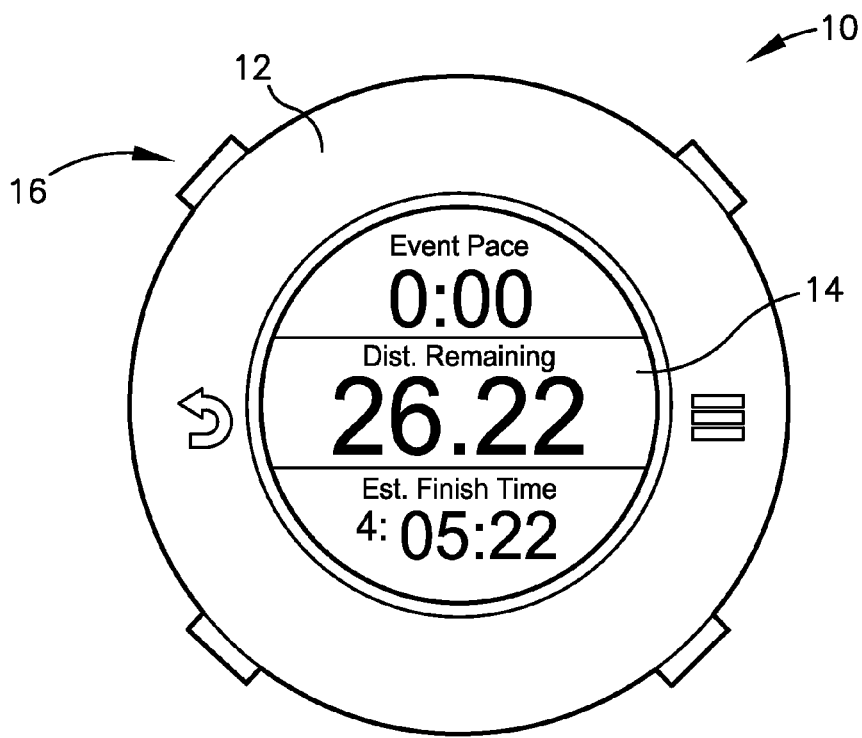
FIG. 2 is a top view of a display of the electronic device of FIG. 1, illustrating a first set of performance metrics determined by the electronic device.
Figure 3:
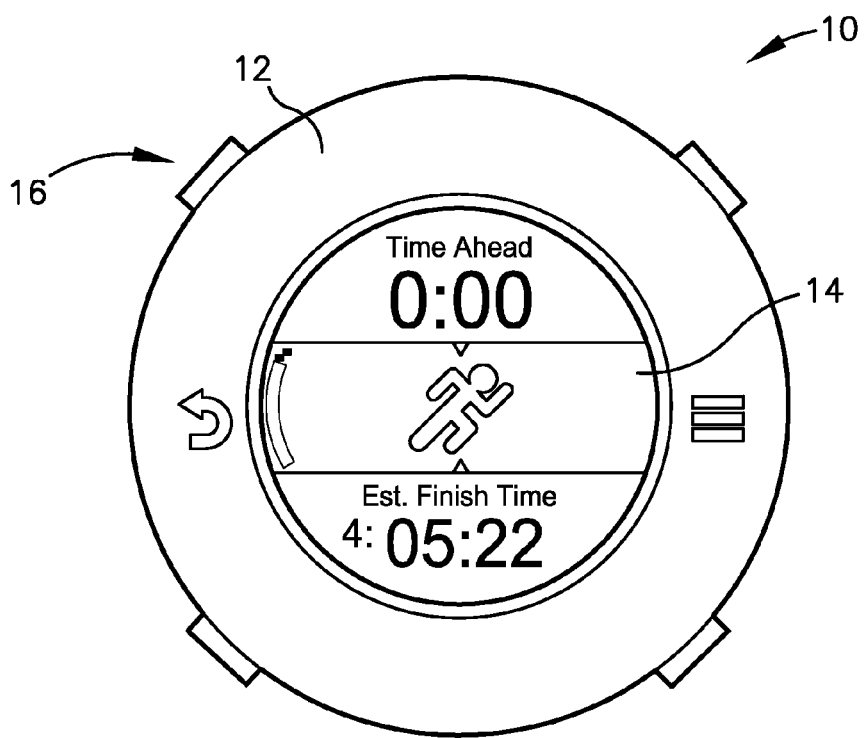
FIG. 3 is a top view of the display of the electronic device of FIG. 1, illustrating a second set of performance metrics determined by the electronic device.

The display 14 presents the information mentioned above, such as the time of day and the performance metrics seen in FIGS. 2 and 3. The display 14 may be implemented in one of the following technologies: light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. In some embodiments, the display 14 may have a round, circular, or oval shape. In other embodiments, the display 14 may possess a square or a rectangular aspect ratio which may be viewed in either a landscape or a portrait mode. In some embodiments, the display 14 may further include a lens overlying the viewing area, which may enhance the visibility of the information shown on the display 14.

The user interface 16 allows the user to directly interact with the electronic device 10 and may include pushbuttons, rotating knobs, or the like. In exemplary embodiments such as the one shown in FIG. 1, the housing 12 may include one or more pushbuttons located on the sides thereof that function as at least a portion of the user interface 16. In various embodiments, the display 14 may also include a touch screen occupying the entire display 14 or a portion thereof so that the display 14 functions as at least a portion of the user interface 16. The touch screen may allow the user to interact with the electronic device 10 by physically touching, swiping, or gesturing on areas of the display 14.

The communication element 18 allows communication with external systems or devices, other than GPS systems. The communication element 18 may include signal or data transmitting and receiving circuits, such as amplifiers, filters, mixers, oscillators, digital signal processors (DSPs), and the like. The communication element 18 may establish communication wirelessly by utilizing radio frequency (RF) signals and/or data that comply with communication standards such as cellular 2G, 3G, or 4G, Institute of Electrical and Electronics Engineers (IEEE) 802.11 standard such as WiFi, IEEE 802.16 standard such as WiMAX, Bluetooth™, or combinations thereof. In addition, the communication element 18 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 18 may establish communication through connectors or couplers that receive metal conductor wires or cables or optical fiber cables. The communication element 18 may be in communication with the processing element 26 and the memory element 24.

The location determining element 20 determines a current geolocation of the electronic device 10 and may receive and process radio frequency (RF) signals from a global navigation satellite system (GNSS) such as the global positioning system (GPS) primarily used in the United States, the GLONASS system primarily used in Russia, or the Galileo system primarily used in Europe. The location determining element 20 may accompany or include an antenna to assist in receiving the satellite signals. The antenna may be a patch antenna, a linear antenna, or any other type of antenna that can be used with location or navigation devices. The location determining element 20 may include satellite navigation receivers, processors, controllers, other computing devices, or combinations thereof, and memory. The location determining element 20 may process a signal, referred to herein as a "location signal", from one or more satellites that includes data from which geographic information such as the current geolocation is derived. The current geolocation may include coordinates, such as the latitude and longitude, of the current location of the electronic device 10. The location determining element 20 may communicate the current geolocation to the processing element 26.

Although embodiments of the location determining element 20 may include a satellite navigation receiver, it will be appreciated that other location-determining technology may be used. For example, cellular towers or any customized transmitting radio frequency towers can be used instead of satellites may be used to determine the location of the electronic device 10 by receiving data from at least three transmitting locations and then performing basic triangulation calculations to determine the relative position of the device with respect to the transmitting locations. With such a configuration, any standard geometric triangulation algorithm can be used to determine the location of the electronic device. The location determining element 20 may also include or be coupled with a pedometer, accelerometer, compass, or other dead-reckoning components which allow it to determine the location of the electronic device 10. The location determining element 20 may determine the current geographic location through a communications network, such as by using Assisted GPS (A-GPS), or from another electronic device. The location determining element 20 may even receive location data directly from a user.

The wireless receiving element 22 receives signals from the transmitters positioned along the course 100. For example, transmitters may be positioned at the start point, end point and a plurality of intermediate event points along course 100. The wireless receiving element 22 may be active or passive and may include components such as antennas, inductive coils, amplifiers, or the like. When the wireless receiving element 22 receives a transmitted signal from the transmitter, it may communicate a signal, data, or other information to the processing element 26 that the transmitted signal has been received. However, various configurations of the device 10 may lack the receiving element 22 and determine the location of event points utilizing other methods, such as stored cartographic data.

The memory element 24 may include data storage components such as read-only memory (ROM), programmable ROM, erasable programmable ROM, random-access memory (RAM), hard disks, floppy disks, optical disks, flash memory, thumb drives, universal serial bus (USB) drives, or the like, or combinations thereof. The memory element 24 may include, or may constitute, a "computer-readable medium". The memory element 24 may store instructions, code, code segments, software, firmware, programs, applications, apps, services, daemons, or the like that are executed by the processing element 26. The memory element 24 may also store settings, data, documents, sound files, photographs, movies, images, databases, and the like.

Figure 5:
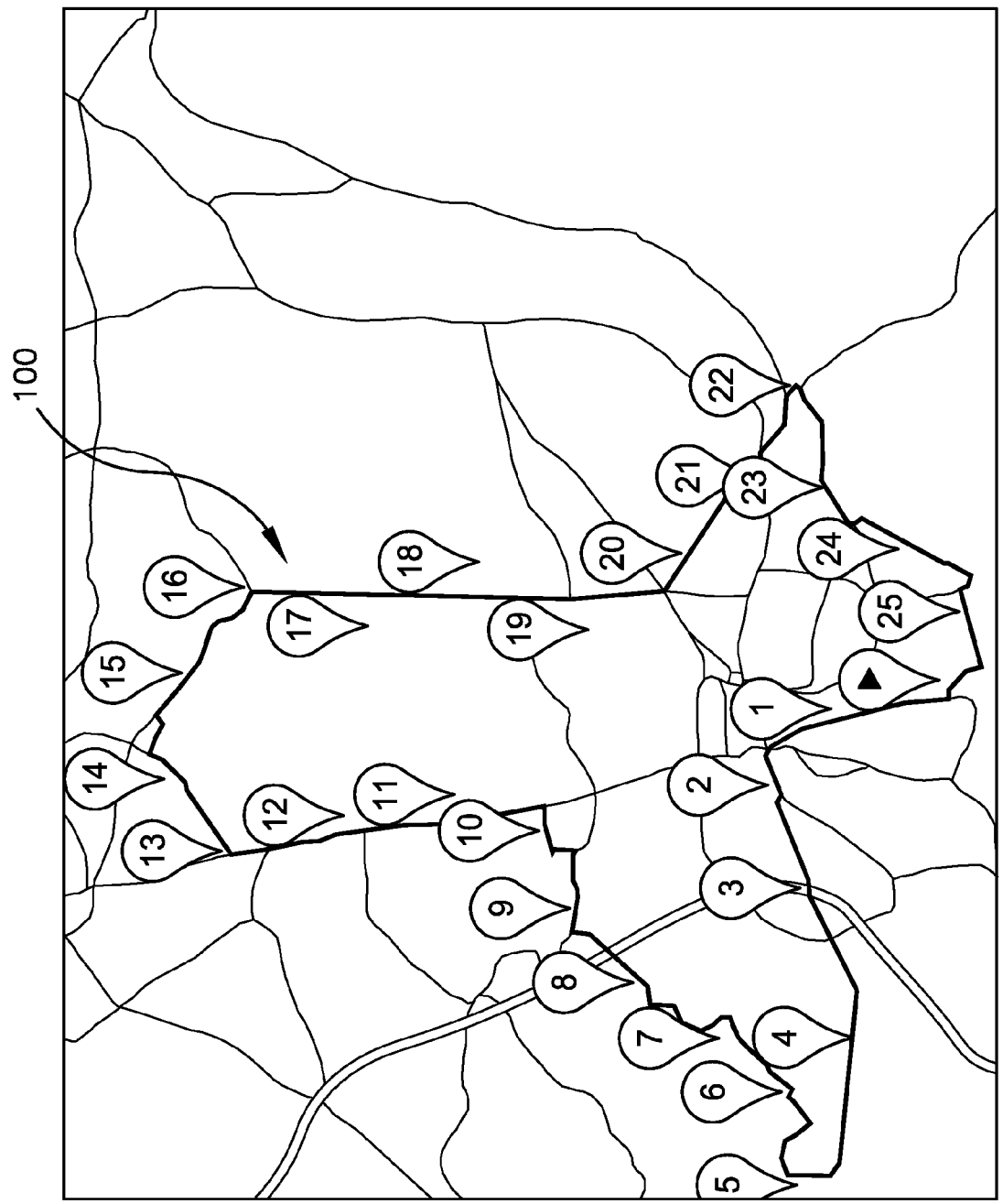
FIG. 5 is a view of a map depicting a course on which the user may travel while wearing the electronic device of FIG. 1.

In some embodiments, the memory element 24 may store a plurality of geolocations that correspond to the event points. The stored geolocations may include the geolocations associated with one or more intermediate points that are a specified and known distance from another geolocation, such as the start point of the course 100 or another intermediate event point of course 100 (e.g., event points). The stored event points may include mile markers, restrooms, aid stations, water stations, and the like. For example, the intermediate event points may correspond to mile markers, as is shown in FIG. 5. Thus, the memory element 24 may store a geolocation for every mile along the course 100. Alternatively, the event points may be positioned at other intervals such as tenth-mile intervals. Accordingly, the memory element 24 may store the geolocations for event points at 0.1 miles (mi), 0.2 mi, 0.3 mi, and so forth from the start point of the course 100. In some embodiments, the distance from the start point to each event point or the distance between intermediate event points may not be stored in the memory element 24. In other embodiments, the distance from the start point to each intermediate event point, the distance between intermediate event points, or a combination of the two may be stored in the memory element 24. In addition, map data or other geographic data for the course 100 may be stored in the memory element 24.

Figure 4:
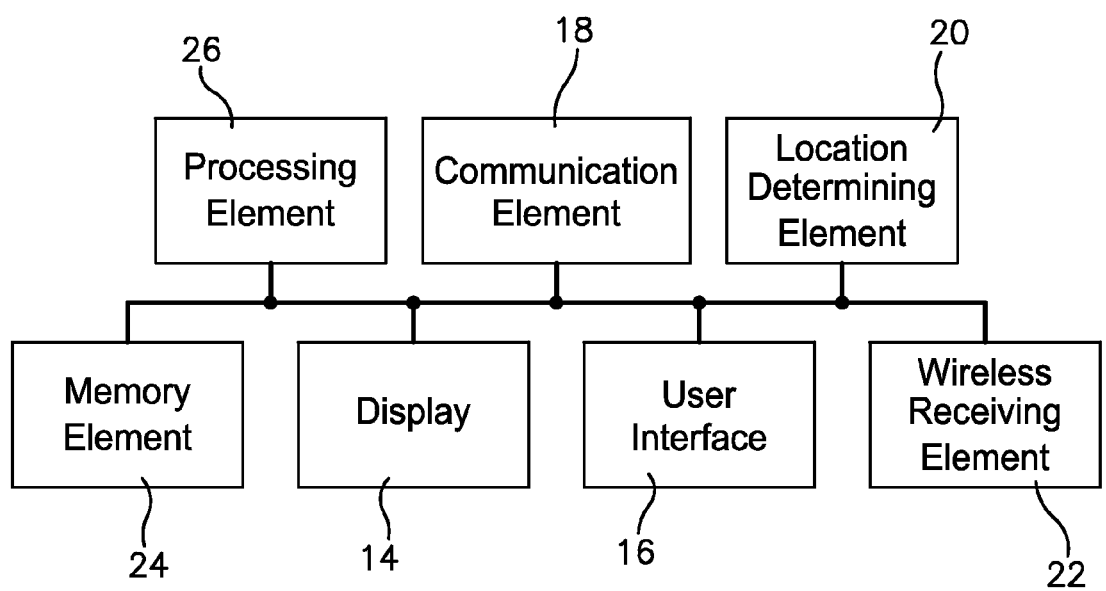
FIG. 4 is a schematic block diagram of some of the components of the electronic device of FIG. 1.

The processing element 26 may include processors, microprocessors, microcontrollers, digital signal processors (DSPs), field-programmable gate arrays (FPGAs), analog and/or digital application-specific integrated circuits (ASICs), or the like, or combinations thereof. The processing element 26 may generally execute, process, or run instructions, code, code segments, software, firmware, programs, applications, apps, processes, services, daemons, or the like, or may step through states of a finite-state machine. The processing element 26, as seen in FIG. 4, may be in communication with the other electronic components through serial or parallel links that include address busses, data busses, control lines, and the like. The processing element 26 may further include or be in communication with timing components such as oscillators, crystals, timing circuitry, and the like that can measure or detect the time elapsed between two or more events. The timing components may also be able to determine the time of day.

The processing element 26 may be configured to determine a measured distance that the user has traveled between a current geolocation of the user and a stored geolocation. In some instances, the stored geolocation may be the start point of the course 100. In other instances, the stored geolocation may be another event point or any other location. The processing element 26 may calculate the measured distance as a function of the geolocation of the stored geolocation and the current geolocation of the user by using distance calculation techniques that are known, such as a straight-line distance calculation, a great-circle distance calculation, or other methods. In configurations, the measured distance may be calculated at regular intervals and summed over time to indicate the distance traveled by the user along the course 100.

The current geolocation may be different from the user's actual location, for various reasons. For example, atmospheric conditions or location determining element 20 performance can lead to differences. A course 100 may be defined by an official route, which may pass through the center of course segments (e.g., road, path, defined portion of open water areas, etc.), and that official route may be used to determine the length of the course 100. Most participants are unable to travel along the official route and may deviate from the centerline of the official route when traveling along the course 100. For example, a user may cut corners, run an inside or outside line, or even miss a turn, leading to an erroneous measured distance. This can cause errors when the processing element 26 determines the measured distance. In order to reduce the errors, the processing element 26 may determine a calibrated distance, which is based on the known distance of an event point from a stored geolocation.

In embodiments, the processing element 26 may determine the calibrated distance as a sum of the known distance of the most recently passed event point. For example, as the user passes a 10 mile marker on the course 100, the processing element 26 may determine the calibrated distance to be 10 miles—even if the measured distance is 10.2 miles. As the user moves between event points (e.g., as the user runs from the 10 mile marker to the 11 mile marker), the calibrated distance may be determined using the sum of the known distance of the most recently passed event point (e.g., 10 miles in this example) and the measured distance from the current geolocation to the most recently passed event point. So, for instance, if the user has run ½ mile from the 10 mile marker, the calibrated distance could be computed to be 10.5 miles—10 miles determined by using the known distance of the mile marker and 0.5 mile determined by measurement from the current geolocation. Thus, if the user has passed the start point, but has not yet passed an intermediate event point, then the calibrated distance is equal to the measured distance from the start point because the user has not yet passed by an event point positioned at a known distance from a stored geolocation. As the user passes the first event point, the known distance from the first event point to the start point is retrieved from the memory element 24 and used to determine a calibrated distance. In embodiments, the measured distance is reset to begin measuring from the event point as the user passes an event point. Thus, the calibrated distance may simply be the known distance of the first event point from the start point when the processing element 26 determines the user is at the first event point. In embodiments, a timer associated with the activity may automatically reset to begin measuring time elapsed after passing the event point. Thus, the time information presented to a user on display 14 may include a total time elapsed, average time to pass between event points (e.g., one mile) and the time needed to pass between each event point.

This calibrated distance is more likely to result in a meaningful indication of remaining course distance (and associated metrics like pace) than the measured distance due to the various errors discussed above. Thus, as shown in FIGS. 2 and 3, the device 10 may present information such as distance remaining, pace, estimated finish time, goal information, and other data using the calibrated distance. The goal information may include a time goal, a calories burned goal and other fitness goals. For example, if the user desires to run a marathon in 4 hours, the calibrated distance may provide a better indication than measured distance as to the remaining course distance and the associated pace required to meet the user's goal.

In embodiments, memory element 24 may store event points, such as mile markers, used along a course 100 and processing element 26 may determine a calibrated distance traveled along course 100 by associating an intermediate event point with the start point and accounting for subsequent intermediate event points. For example, a user of device 10 may begin his travel along a course 100 having many event points at an intermediate location of course 100 (e.g., at the 14th mile marker of a 25-mile trail). For example, the calibrated distance traveled for a user of device 10 who began traveling along course 100 at or before the 14th mile marker and passed the 17th mile marker may be based on a known distance of 3.0 miles for the geolocations between the 14th and 17th mile markers.

In embodiments, the event point information presented on display 14 may be synchronized with distance information presented on local event points along course 100 (e.g., current mile indication on mile markers) to aid the user of device 10 as he travels along course 100. Display 14 of device 10 may identify the distance information presented on local event points as the user travels along course 100. For example, display 14 may identify the 16th mile marker as the second mile along course 100 if the user of device 10 begins traveling along course 100 at the 14th mile marker of course 100. The display 14 may present a first element to identify the name of the course 100 and a second element to indicate that the current geolocation determined by location determining component 20 corresponds to a stored mile marker as the user travels along course 100. The second element may be updated to identify the current mile marker as device 10 proceeds along course 100 (e.g., second element may be updated from the 16th mile marker to the 17th mile marker as the device 10 passes the mile marker associated with the 17th mile of course 100). It is to be understood that the stored markers may correspond to any unit of measurement (e.g., kilometers, yards, etc.).

After the user passes the first event point and until a second event point is passed, the calibrated distance may be the sum of the known distance of the first event point from a start point and the measured distance from the first event point to the current geolocation. As the user passes the second event point, the known distance from the first event point to the start point or the first event point is retrieved from the memory element 24 and used to determine a calibrated distance. In embodiments, the measured distance is reset to begin measuring from the second event point as the user passes the event point. Hence, the calibrated distance may simply be the known distance of the second event point from the start point or the first event point when the processing element 26 determines the user is at the second event point.

The processing element 26 may continue determining the calibrated distance in this fashion until the course 100 is complete. Therefore, using this process, the distance traveled by the user along course 100 is calibrated using a known distance of one or more event points from a stored geolocation, such as the start point or intermediate event points between the start point and an end point. Therefore, each time the user passes an event point like a mile marker, the calibrated distance accurately reflects the user's location on the course 100. And, in configurations including a finish line (end point), the calibrated distance can be set to the known distance of the finish line—e.g., total course distance.

In embodiments, device 10 may use the determined calibrated distance to provide more accurate information to the user. Information provided on display 14 may include an accurate distance to an end point of course 100, the time goal to reach the end point and the time required to reach the end point based on a current pace and/or a target pace. As the user passes an event point along a course 100, the user may arrive earlier or later than anticipated to complete the course 100 at a desired time goal and/or the current pace of the user may be above or below a target pace for completing the course 100. In embodiments, processing element 26 may determine a performance metric, such as pace, based on the calibrated distance and goal information as the user passes each event point along the course 100.

The processing element 26 may determine a performance metric, such as a recommended pace, required for the user to reach the end point based on the calibrated distance and a time goal to complete the course 100. For example, processing element 26 may determine an increased pace is required to reach the end point based on a time goal if processing element 26 determines that the user has passed an event point later than anticipated to complete course 100 at the user's time goal or that the current pace of the user is below a required or target pace. Similarly, processing element 26 may determine an decreased pace is required to reach the end point based on a time goal if processing element 26 determines that the user has passed an event point earlier than anticipated to complete the course 100 at the user's time goal or that the current pace of the user is above a required or target pace.

The recommended or required pace may be presented on display 14 as a numeric value or a graphic incorporating one or more graphical elements, such a virtual partner feature, in association with other information. The graphical elements may be icons (runner) or symbols accompanied by numeric and/or textual information. For example, display 14 may present a current pace of "6 miles/hour" (or "10:00/mile") and/or a required pace of "6.5 miles/hour" (or "9:23/mile") to aid the user to meet one or more performance goals. In embodiments, display 14 may present a graphic to depict comparison of a current pace and/or required pace on all of or a portion of its display region. For example, display 14 may present a first graphical element associated with a current pace positioned behind a second graphical element associated with a required pace to a user who must travel at an increased pace along course 100 to reach the end point based on a time goal if processing element 26 determines that the user has passed an event point later than anticipated to complete the course 100 at the user's time goal or that the current pace of the user is below a required or target pace. Similarly, display 14 may present a first graphical element associated with a current pace positioned in front of a second graphical element associated with a required pace to a user who must travel at a decreased pace along course 100 to reach the end point based on a time goal. In embodiments, one or more graphical elements associated with event points may be presented on display 14 to aid users. For example, display 14 may present a first graphical element associated with a current pace, a second graphical element associated with a required pace and the finish line of course 100. The graphical elements may be positioned on display 14 in a horizontal manner or concentrically around the perimeter of display 14. Various other techniques for conveying performance information using graphics and numeric values to enhance ease of understanding the presented information are contemplated.

In embodiments, processing element 26 may determine a ratio of measured distance to known distance of one or more event points that have been previously traveled using device 10 or another electronic device. For example, a comparison of measured distance to an event point with the known distance to an event point may reveal that the measured distance determined by location determining element 20 is approximately three percent (3%) less than the known distance of each event point. Processing element 26 may apply this determined measurement error information to determine a calibrated distance as the user passes between event points in an improved manner. Applying the above example, the calibrated distance between a first event point and a second event point may be the sum of the known distance of the first event point from a start point and a three percent (3%) increase to the measured distance from the first event point to the current geolocation. Thus, the ratio of measured distance to known distance may enable processing element 26 to account for a predicted error in distance measurement as the user travels between event points associated with course 100. In some instances, inaccuracies between measured distance and known distance may not be limited to device 10 and may be correlated to fitness characteristics associated with a user. In embodiments, the ratio of measured distance to known distance may be a predetermined ratio applicable to one or more courses 100 stored in memory element 24 or stored remotely on a website, such as Garmin Connect, and loaded into memory element 24 of device 10 for use by processing element 26.

In embodiments, a remote website, such as Garmin Connect, may analyze data associated with users who have previously traveled course 100 in a competition or practice in preparation for a competition. One or more servers for the website may determine a predicted error based on the data received from users who have traveled along course 100 or a plurality of courses 100. The predicted error ratio and related information may be stored remotely on a server and loaded into memory element 24 of device 10 for use by processing element 26 while traveling along course 100 in a competition or practice in preparation for a competition. In embodiments, an error may be determined for a course 100 based on stored data associated with course 100 for use by a plurality of users having devices 10 while traveling along course 100. In embodiments, the one or more servers may determine an error for a user based on past travels along a plurality of courses 100 by that user.

The processing element 26 may determine that the user has passed an event point when the current geolocation received from the location determining element 20 is approximately equal to the geolocation of an event point. For example, the processing element 20 may use a range around the geolocation of the event marker and determine that the user has passed the event marker when the user enters and/or exits the range. It may be assumed that the user passes the event points in the order that they appear along the course 100. Thus, the processing element 26 need not randomly compare the current geolocation with stored geolocation of every event point. The processing element 26 may compare the current geolocation with the one or more stored geolocations that precede the current geolocation along course 100 to determine a measured distance and/or a calibrated distance. In embodiments, the processing element 26 may compare the current geolocation with the one or more stored geolocations that are past the current geolocation along course 100 to determine a measured distance and/or a calibrated distance.

In various embodiments, as the user passes an event point, the processing element 26 may alternatively or additionally determine the calibrated distance to be an average of the known distance of the event point and the measured distance from the last event point or the start point of the course 100. For example, if the measured distance from the third event point along course 100 to the start point is 2.45 miles and the known distance from the third event point to the start point is 2.55 miles, the processing element 26 may determine the calibrated distance to be 2.5 miles when the user passes the event point. Similarly, if the measured distance from the third event point along course 100 to the second point is 0.8 miles and the known distance from the third event point to the second event point is 0.9 miles, the processing element 26 may determine the calibrated distance from the second event to be 0.85 miles when the user passes the third event point.

In between intermediate event points, the processing element 26 may determine the calibrated distance as a function of a measured distance and a known distance of an event point from a stored geolocation as described above. For example, in embodiments, a calibrated distance based on an average of a known distance from a second event point to the start point and a measured distance from the second event point to the start point may be added to a measured distance determined from the second event point to a current geolocation of the user to determine a calibrated distance from the start point.

The processing element 26 may further determine performance metrics, as shown on the display 14 of FIGS. 2 and 3, on a repeated basis while the user is traveling along course 100 that are based on the calibrated distance, such as the current pace or speed of the user, the amount of time for finishing the course 100 given the current pace, the distance remaining to finish the course 100, the pace required to meet the user's time goal and the like. In order to determine the current pace and the finishing time, the processing element 26 may utilize one or more timers that automatically begin measuring elapsed time upon the occurrence of certain events, such as the user crossing the starting point of the course 100, and automatically stop measuring elapsed time upon the occurrence of certain events, such as the user crossing the end point of course 100. In embodiments, device 10 may begin determining, and storing in memory element 24, measurements associated with time, distance traveled, cardiovascular characteristics or performance metrics based on the occurrence of a competitive event, such as a marathon, near a current geolocation determined by the location determining element 20. In other embodiments, the user can enter, via the user interface 16, his arrival at the starting point, intermediate event points and/or the end point of course 100 to start or stop timers and/or storage of information related to a competitive or training event in memory element 24. Furthermore, the user can enter, via the user interface 16, a desired amount of time for finishing the course 100 which is then stored in the memory element 24. The processing element 26 may retrieve the desired finishing time and may compute a desired pace for traveling the course 100 to meet the user's goal. In addition, the processing element 26 may determine the difference between the current pace and the desired pace based on the calibrated distance. Since the performance statistics are based on the calibrated distance, the user can more accurately analyze his performance and make adjustments to meet the desired goals as necessary while traveling course 100.

The electronic device 10 may function as follows. Before starting a run, a jog, a walk, a hike, or other activity on a course 100, the user may store in the memory element 24 a plurality of geolocations that correspond to the event points of the course 100. The geolocations may be obtained from a website associated with a particular event, such as a marathon, and may be stored in the memory element 24 via the communication element 18. Alternatively, the geolocations may be obtained from cartographic data, manually entered by the user, via user interface 16.

In embodiments, the user may traverse the course 100 in training before the competitive event occurs and record the geolocations of the event points (including the starting point, the intermediate event points, and the end point) using the electronic device 10 or another GPS device. In embodiments, the user may manually add customized event points, via a website or user interface 16, to electronic device 10 that have significance to the user in preparation for a competitive event on course 100. The user-specified event points may not correspond to any official geolocations associated with a course 100 traveled in a competitive event. For example, the user may manually input, via the website or user interface 16, an event point associated with a landmark along course 100. In embodiments, the user may manually input the event point via user interface 16 while traveling along course 100 to train for a competitive event on course 100. The user may also store map data, route data, or other geographic data for the course 100 in the memory element 24.

In addition, the user may enter, via the user interface 16, a target pace and/or a desired amount of time for reaching one or more intermediate event points and/or finishing the course 100. For example, the user may input a race plan based on desired goal times for specific portions of or terrain characteristics associated with a course 100 (e.g., flat areas, hills, etc.). A user may enter, via user interface 16, one or more goal times for each mile of a course 100 traveled in a race. For example, the user may input a goal time of 7 minutes/mile for miles 1, 3-6 and 9 of a ten-mile course 100 and a goal time of 8 minutes/mile for miles 2, 7-8, and 10 of course 100. A user may also enter, via user interface 16, one or more goal times for each terrain of a course 100 traveled in a race. For example, the user may input a goal time of 6 minutes/mile for substantially flat portions of course 100 having a low grade (or slope) of terrain and a goal time of 10 minutes/mile for substantially steep portions of course 100 having a high grade (or slope) of terrain. The user may also input this race plan information or it may be stored remotely on a website, such as Garmin Connect, and loaded into memory element 24 of device 10 for use by processing element 26. For instance, a user may input race plan information to the website in preparation for traveling along course 100 in a competition. Users may return to the website after course 100 has been traveled in a competition or in preparation for a competition to revise a race plan as desired. In embodiments, device 10 may present information, such as a virtual partner, on display 14 to aid the user with completing one or more portions of the course 100 at a desired time.

In embodiments, communication element 18 of device 10 may receive information associated with a competitive event along course 100 if the current geolocation determined by location determining element 20 for the user is near course 100. Information received by communication element 18 may include event points associated with course 100, recommended pace information, fitness metrics for one or more users, and other information that may aid a user of device 10 (e.g., weather, total number of registered participants, etc.). The information may be provided by servers associated with a website (e.g., Garmin Connect) and associated with one or more registered users of the website. The received information may be stored in memory element 24 and used by processing element 26 as the user travels along course 100.

In embodiments, display 14 may present a prompt notifying the user that device 10 is near a course 100 and that information associated with the course 100 is available for download at any time (e.g., for training weeks before the scheduled competitive event, for use during the scheduled competitive event, etc.). The user may provide, via user interface 16, an acknowledgement of the prompt and authorization to download the data from a remote source, such as a website (e.g., Garmin Connect). Device 10 may provide a prompt notifying the user of a course 100 based on a date and time associated with a competitive event. For example, display 14 may automatically present an option to download information from a remote source if the current geolocation determined by location determining element 20 is near a course 100 used for the New York City Marathon at or shortly before the Marathon begins.

The user may begin traveling on the course 100. As soon as he passes the start point, the current geolocation, as provided by the location determining element 20, may be approximately equal to the geolocation of the start point stored in the memory element 24. In some embodiments, the user may pass a transmitter at the start point which transmits a signal to the wireless receiving element 22, which in turn communicates to the processing element 26 that the start point transmitter has been passed. In any case, the processing element 26 may automatically determine that the user has passed the start point and may perform actions such as setting the calibrated distance and the measured distance to zero, resetting the performance metrics, starting one or more timers to track the elapsed time that the user has traveled on the course 100, and the like. The user may also manually indicate his or her presence at the starting point. The display 14 may show the time of day, the calibrated distance, the measured distance from the start point or an event point, the elapsed time traveling the course 100, any of the performance metrics, or combinations thereof.

As the user travels the course 100, the calibrated distance and the measured distance may be determined on a regular basis. In addition, the processing element 26 may update the performance metrics, such as the current pace and the estimated finishing time, based on the calibrated distance. The processing element 26 may also determine when the user passes the end point of the course 100 and may automatically stop determining the calibrated distance and all of the performance metrics. In some embodiments, the user may pass a transmitter at the end point which transmits a signal to the wireless receiving element 22, which in turn communicates to the processing element 26 that the end point transmitter has been passed. Further, the user may manually input his or her presence at the end point. The display 14 may show the final distance as well as one or more of the performance metrics.

In embodiments, device 10 may automatically share information as the user travels along course 100. For example, communication element 18 of device 10 may automatically transmit a message when the user passes an event point. The message may include identification information for the event point passed by device 10, a current time and date, and fitness information determined based on the calibrated distance (e.g., current pace, a pace required to meet the user's goal, etc.). Communication element 18 may transmit the message to a website, such as Garmin Connect, or to devices associated with other individuals (e.g., sending a text message to a phone). In embodiments, messages intended for the user of device 10 may be received by communication element 18 and presented on display 14. For example, other individuals may desire to provide a motivational message to the user of device 10 by inputting the message to a website, such as Garmin Connect, or a personal device.

Although the technology has been described with reference to the embodiments illustrated in the attached drawing figures, it is noted that equivalents may be employed and substitutions made herein without departing from the scope of the technology as recited in the claims.

What is claimed is:

1. An electronic device for tracking a distance traveled by a user along a course, the electronic device comprising:
   a location determining element configured to receive location signals from a satellite-based positioning system and to determine a current geolocation of the user;

a memory element configured to store geolocations for a start point and a plurality of event points positioned on the course and known distances from the start point to the event points; and a processing element in communication with the location determining element and the memory element, the processing element configured to determine a measured distance based on the current geolocation of the user determined by the location determining element and a calibrated distance using the geolocations of the event points;

a display, wherein the processing element determines a remaining distance of the course using the calibrated distance and a pace required to reach the end point based on a time goal, and the required pace is presented on the display;

wherein the processing element determines the calibrated distance to be a sum of the known distance of a most recently passed event point from the start point and the measured distance from the most recently passed event point to the current geolocation determined by the location determining element.

2. The electronic device of claim 1, wherein the calibrated distance is presented on the display.

3. The electronic device of claim 1, wherein the processing element determines that the calibrated distance is equal to the corresponding stored known distance from the start point to each event point as the user passes each event point.

4. The electronic device of claim 3, wherein the processing element determines the user has passed an event point when the current geolocation is approximately equal to the geolocation of the event point.

5. The electronic device of claim 1, wherein the event points are mile markers along the course.

6. The electronic device of claim 1, further comprising a wireless receiving element configured to receive at least a first transmitter signal indicating the start point and a second transmitter signal indicating the end point.

7. The electronic device of claim 1, wherein the event points include a plurality of intermediate event points and an end point.

8. The electronic device of claim 7, wherein the processing element automatically starts determining the calibrated distance when the user passes the start point and automatically stops determining the calibrated distance when the user passes the end point.

9. The electronic device of claim 1, wherein the processing element determines a remaining distance of the course using the calibrated distance.

10. An electronic device for tracking distance traveled by a user along a course, the electronic device comprising:
a display;
a location determining element configured to receive location signals from a satellite-based positioning system and to determine a current geolocation of the user;
a memory element configured to store geolocations for a start point, an end point, and a plurality of intermediate event points that are passed by the user as he travels along the course, each event point positioned at a known distance from a stored geolocation; and
a processing element in communication with the location determining element and the memory element, the processing element configured to determine—
a measured distance based on the current geolocation of the user,
a calibrated distance using the known distances of the event points, wherein the calibrated distance is equal to a sum of the known distance of a most recently passed event point and the measured distance from the most recently passed event point to the current geolocation,
a current pace of the user traveling the course as a function of the calibrated distance, and
a remaining distance of the course using the calibrated distance and the pace required to reach the end point based on the time goal;
wherein the display is configured to present the calibrated distance, the current pace and a pace required to reach the end point based on a time goal.

11. The electronic device of claim 10, wherein the memory element stores the known distance from the start point to each intermediate event point and end point.

12. The electronic device of claim 10, further comprising a wireless receiving element configured to receive at least a first transmitter signal indicating the start point and a second transmitter signal indicating the end point.

13. The electronic device of claim 10, wherein the processing element automatically starts determining the calibrated distance when the user passes the start point and automatically stops determining the calibrated distance when the user passes the end point.

14. The electronic device of claim 10, wherein the stored geolocation is at least one of the start point or another event point.

15. The electronic device of claim 10, wherein the event points are mile markers along the course.

16. The electronic device of claim 10, wherein the processing element determines that the calibrated distance is equal to the corresponding stored known distance from the start point to each event point as the user passes each event point.

17. An electronic device for tracking distance traveled by a user along a course, the electronic device comprising:
a display configured to display information that is updated as the user travels along the course;
a location determining element configured to receive location signals from a satellite-based positioning system and to determine a current geolocation of the user;
a memory element configured to store geolocations for a start point, an end point, and a plurality of intermediate event points that are passed by the user as he travels along the course, each event point positioned at a known distance from the start point; and
a processing element in communication with the location determining element and the memory element, the processing element configured to determine—
a measured distance based on the current geolocation of the user,
a calibrated distance that is equal to the sum of the known distance of a most recently passed event point and the measured distance from the most recently passed event point to the current geolocation,
a current pace of the user traveling the course as a function of the calibrated distance,
a remaining distance of the course using the calibrated distance, and
a pace required to reach the end point based on a time goal;
wherein the required pace is presented on the display.

18. The electronic device of claim 17, wherein the memory element stores the known distance from the start point to each intermediate event point and end point.

19. The electronic device of claim 17, wherein the processing element automatically starts determining the calibrated distance when the user passes the start point and automatically stops determining the calibrated distance when the user passes the end point.

* * * * *